US 6,430,130 B1

(12) United States Patent
Furukawa (10) Patent No.: US 6,430,130 B1
(45) Date of Patent: Aug. 6, 2002

(54) SERVO CONTROL FOR CORRECTING ERRORS IN TILT ANGLE OF OPTICAL BEAM

(75) Inventor: Junichi Furukawa, Tsurugashima (JP)

(73) Assignee: Pioneer Electronic Corporation, Tokyo-To (JP)

(*) Notice: Subject to any disclaimer, the term of this patent is extended or adjusted under 35 U.S.C. 154(b) by 0 days.

(21) Appl. No.: 09/268,614

(22) Filed: Mar. 15, 1999

(30) Foreign Application Priority Data

Mar. 20, 1998 (JP) .......................................... 10-072888

(51) Int. Cl.$^7$ ................................................ G11B 7/00
(52) U.S. Cl. .................................. 369/53.19; 369/44.32
(58) Field of Search ........................... 369/13.05, 13.14, 369/44.32, 53.19, 112.02, 44.23, 112.24, 124.14, 44.35, 53.14, 53.15, 44.13; 318/638

(56) References Cited

U.S. PATENT DOCUMENTS

| | | | | |
|---|---|---|---|---|
| 5,001,690 A | * | 3/1991 | Kamiya et al. | 369/44.32 |
| 5,027,336 A | * | 6/1991 | Sugiura | 369/44.13 |
| 5,502,698 A | * | 3/1996 | Mochizuki | 369/44.32 |
| 5,627,808 A | * | 5/1997 | Hajjar et al. | 369/44.29 |
| 5,699,340 A | * | 12/1997 | Lee et al. | 369/112.28 |
| 5,703,855 A | * | 12/1997 | Kirino et al. | 369/124.14 |
| 5,859,818 A | * | 1/1999 | Tateishi et al. | 369/112.02 |
| 5,886,496 A | * | 3/1999 | Furukawa et al. | 318/638 |
| 5,914,923 A | * | 6/1999 | Araki et al. | 369/112.24 |
| 6,078,554 A | * | 6/2000 | Ootaki et al. | 369/112.02 |
| 6,125,088 A | * | 9/2000 | Ogasawara | 369/112.02 |
| 6,172,950 B1 | * | 1/2001 | Tanaka | 369/13.05 |

* cited by examiner

Primary Examiner—William Korzuch
Assistant Examiner—Kim-Kwok Chu
(74) Attorney, Agent, or Firm—Ladas & Parry (57) ABSTRACT

A tilt servo control apparatus for an optical disk is provided, which is able to keep a high reproduction quality by correcting tilt errors with its construction simplified and compact. The tilt servo-control apparatus includes: an optical pickup for irradiating an optical beam onto an optical disk and detecting a reflected light from the optical disk; a tilt-correction unit for correcting, using a correction amount, a tilt error due to aberration caused by a tilt angle formed between an optical axis of the optical beam and a normal line of the optical beam at an emitted position on the optical disk; an amplitude detecting unit for detecting a maximum amplitude and a minimum amplitude of a detected signal by the optical pickup within a period of one rotation of the optical disk; and a tilt-correction controlling unit for providing a control signal to control the correction amount used in the tilt-correction unit. The tilt-correction controlling unit includes a unit for applying variations to the control signal and adjusting the control signal so that a difference between the maximum amplitude and the minimum amplitude is minimized responsively to the variations.

15 Claims, 8 Drawing Sheets

SERVO CONTROL FOR CORRECTING ERRORS IN TILT ANGLE OF OPTICAL BEAM

BACKGROUND OF THE INVENTION

1. Field of the Invention

The present invention relates to a tilt servomechanism for correcting tilt errors of an optical beam irradiated onto an optical disk.

2. Description of the Prior Art

In general, in using optical disks including CDs or DVDs, warps of such optical disks causes the problem that a tilt angle made between the axis of an optical beam emitted from an optical pickup and the disk surface deviates from a right angle at a beam-irradiated position. The deviation is known as "tilt error." The tilt error occurs mainly in the radial direction of optical disk, resulting in coma aberration of optical systems. Moreover, the tile error will cause crosstalk between adjacent tracks or deterioration of jitters, thereby bringing about an undesirable effect on reproduction quality of the optical disk. Particularly, if information is recorded at a high density like DVD, a laser beam is required to be smaller in its spot diameter. Namely, it is necessary to shorten the wavelength $\lambda$ of a laser beam as well as to increase the numerical aperture NA of an objective lens. This results in fewer margins for the tilt angles. Therefore, a slight tilt of an optical disk causes a greater degree of deterioration in reproduction quality. To correct aberration caused due to inaccurate tilt angles during the reproduction of information, a tilt servo control is normally performed by using both a tilt sensor with an optical beam dedicated to detecting the tilt angle and detected by a detector and a mechanism for controlling the inclination of the optical pickup based on the detected tilt angle.

However, in the above tilt servomechanism, the tilt sensor having a pair of optical beams and a detector should be provided independently of the optical pickup, and a complex mechanism is required to control the inclination of the optical pickup. As a rule, these factors result in the increased manufacturing cost. Additionally, they disadvantageously occupies a large volume of space for installation, thereby disabling the downsizing of the apparatus.

SUMMARY OF THE INVENTION

The present invention has been made in consideration of the above problems. An object of the present invention is to provide a tilt servo control apparatus for an optical disk, which is able to keep a high reproduction quality by correcting the tilt error with simple and compact configuration.

According to one aspect of the present invention, there is provided a tilt servo control apparatus including: an optical pickup for irradiating an optical beam onto an optical disk and detecting a reflected light from the optical disk; a tilt-correction unit for correcting, using a correction amount, a tilt error due to aberration caused by a tilt angle formed between an optical axis of the optical beam and a normal line of the optical beam at an emitted position on the optical disk; an amplitude detecting unit for detecting a maximum amplitude and a minimum amplitude of a detected signal by the optical pickup within a period of one rotation of the optical disk; and a tilt-correction controlling unit for providing a control signal to control the correction amount used in the tilt-correction unit, the tilt-correction controlling unit including a unit for applying variations to the control signal and adjusting the control signal so that a difference between the maximum amplitude and the minimum amplitude is minimized responsively to the variations.

In the above apparatus, even when a tilt angle varies and the aberration of the optical pickup is caused, the aberration is corrected by applying variations to the control signal and minimizing the changes in the amplitude of the detected signal from the optical pickup. When the tilt error is caused, the variations in the amplitude are increased, thereby deteriorating the detection characteristic of the optical pickup, however, the above tilt control can compensate for the error. Therefore, deterioration of reproduction quality, which is caused by tilt errors, can be avoided. The tilt servo control can be performed with no tilt sensor.

It is preferred that the tilt-correction unit includes a liquid crystal panel for correcting the aberration arranged in the optical axis of the optical beam, and the control signal used in the tilt-correction controlling unit is a drive signal applied to the liquid crystal panel. It is also preferred that the tilt-correction controlling unit includes a unit for producing disturbances to be applied to the control signal, a unit for comparing differences between the maximum amplitude and the minimum amplitude corresponding to the disturbance, and a unit for varying the control signal by a given amount such that the differences are reduced.

Thus, the disturbances is added to the control signal in such a way that the difference between the maximum value and the minimum value of the detected signal of the optical pickup decrease. Therefore, like the above, the reproduction quality of an optical disk can be avoided from being deteriorated even when tilt error is caused.

Preferably, the tilt-correction may include a liquid crystal panel for correcting the aberration arranged in the optical axis of the optical beam, and the control signal used in the tilt-correction controlling unit is a drive signal applied to the liquid crystal panel. Thus, with the liquid crystal panel for correcting aberration caused in the optical beam axis, the tilt error is corrected. In consequence, the identical advantages to the above are obtained and the tilt servo control can be done with no mechanism for controlling the inclination of the optical pickup.

In a preferred embodiment, the liquid crystal panel may be divided into three areas consisting of an inner-track-side area, a middle area, and an outer-track-side area in a radial direction of the optical disk, wherein the divided areas are driven by the drive signal independently of each other. Therefore, it is possible to advantageously prevent deterioration of reproduction quality and eliminate a tilt sensor and a mechanism for controlling the inclination of the pickup.

It is preferred that the apparatus further includes temperature detecting unit for detecting a temperature relating to operation of the liquid crystal panel, wherein the tilt-correction unit includes a unit for variably controlling a speed of the variations applied to the control signal on the basis of a result detected by the temperature detecting unit. Accordingly, the temperature detecting unit are used for detecting a temperature of, for example, the liquid crystal panel. In response to the result of the temperature detection, the rate of variations in the control signal is made changed. Thus, if the response characteristic of liquid crystal is deteriorated on account of fluctuations in temperature, the tilt correction can be performed in a highly stable manner. The tilt servo control can be done with preferable temperature characteristics.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Referring to the accompanying drawings, an embodiment according to the present invention will now be described. This embodiment is practiced with an information reproducing apparatus.

Figure 1:
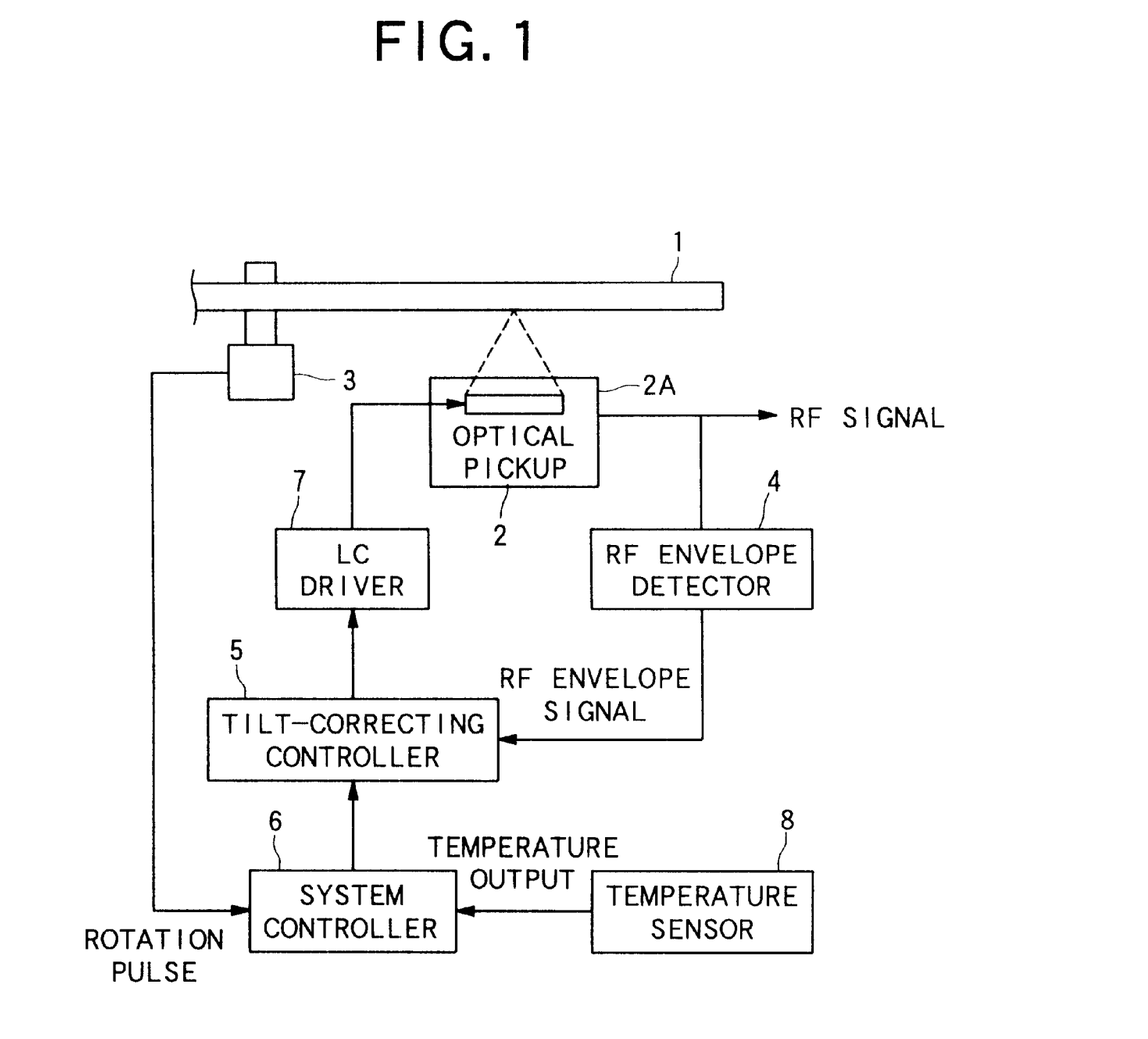
FIG. 1 is a block diagram showing the whole configuration of a tilt servo control apparatus of an embodiment according to the present invention.

FIG. 1 shows the entire configuration of a tilt servo control apparatus according to the present invention. As shown in FIG. 1, the tilt servo control apparatus includes an optical pickup 2 for irradiating an optical beam onto an optical disk 1, a liquid crystal panel 2A constituting a part of the optical pickup, a spindle motor 3, an RF (Radio Frequency) envelope detector 4, a tilt-correction controller 5, a system controller 6, a liquid crystal driver 7, and a temperature sensor 8.

In the above configuration, the optical beam is emitted from the optical pickup 2 onto the optical disk 1, and its reflected light is detected by a detector of the optical pickup 2. The optical detector in the optical pickup 2 outputs an RF signal containing signal components modulated by information pits on the optical disk 1. In the pickup 2, the liquid crystal panel 2A is placed within the optical beam axis in order to correct aberration caused in the optical system. The liquid crystal panel 2A will be described later in terms of its operation.

The spindle motor 3 drives the optical disk 1 so that it rotates at a specified rotation speed, thereby outputting a rotation pulse in synchronism with each rotation of the optical disk 1.

The RF signal provided from the pickup 2 is sent to the RF envelope detector 4. This detector 4 detects changes in the amplitude of the RF signal, i.e., detects an RF envelope signal. In practice, a control voltage signal of a variable gain amplifier used to keep the RF signal at a constant amplitude may be used in the detection by the detector 4. This control voltage signal provides temporal changes in the amplitude of the RF signal.

The RF envelope signal outputted from the detector 4 enters the tilt-correction controller 5, where a maximum value and a minimum value of the RF envelope signal are detected within one rotation interval of the spindle motor 3, and based on the detected signal amounts, disturbances to be applied are obtained for an optimum tilt correction. For tilt correction, this controller 5 provides a control signal processed with PWM (Pulse Width Modulation) to the liquid crystal driver 7 for driving the liquid crystal panel 2A by applying voltage thereto. Accordingly, differences in the phase of transmitted light passing through the liquid crystal panel 2A can be changed to correct the aberration. Thus, the controller 5 acts as tilt-correction unit.

The system controller 6 controls and allows the tilt-correction controller 5 to operate in a manner such that a tilt-correction amount for optimum tilt servo is adjusted while different disturbances are added to a control signal. Both the tilt-correction controller 5 and the system controller 6, which operate together, serve as tilt-correction control unit. The tilt-correction controller 5 will be detailed later in terms of its operation.

Next, referring to FIG. 2, the construction of the liquid crystal panel 2A will be now be described.

Figure 2A:
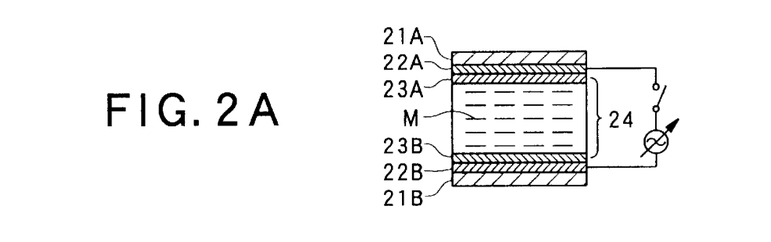
FIGS. 2A to 2C shows a schematic construction of a liquid crystal panel.
Figure 2B:
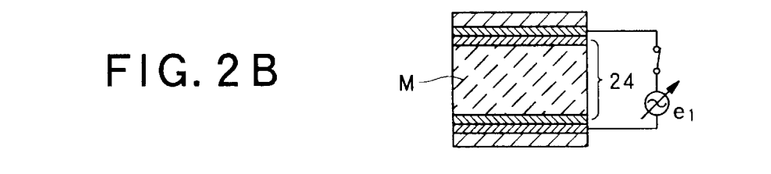

The liquid crystal panel 2A shown in FIG. 2A consists of elements including transparent glass substrates 21A and 21B, transparent electrodes 22A and 22B deposited on the inner surfaces of the glass substrates 21A and 21B, orientation membranes 23A and 23B formed on the inner surfaces of the transparent electrodes 22A and 22B, and a layer of liquid crystal 24 having birefringence and packed between the orientation membranes 23A and 23B.

Figure 2C:
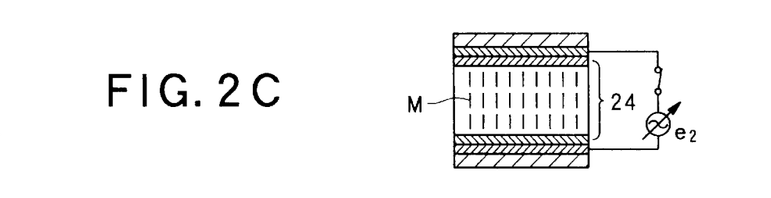

The orientation of molecules M of the liquid crystal 24 can be controlled freely in a range from its horizontal direction illustrated in FIG. 2A to its vertical direction illustrated in FIG. 2C, according to conditions of applied voltage to the transparent substrates 22A and 22B. Birefringence effects of the liquid crystal molecules M provide light rays transmitting the liquid crystal with changes in refraction indices, and allows them to have differences in the optical path "$\Delta n \cdot d$ ($\Delta n$ is a change in refraction index and d is a cell thickness of the liquid crystal 24)". In other words, the phase differences "$\Delta n \cdot d (2\pi C/\lambda : \lambda$ is a wavelength of the light)" can be given to the light that passes through the liquid crystal.

Figure 2D:
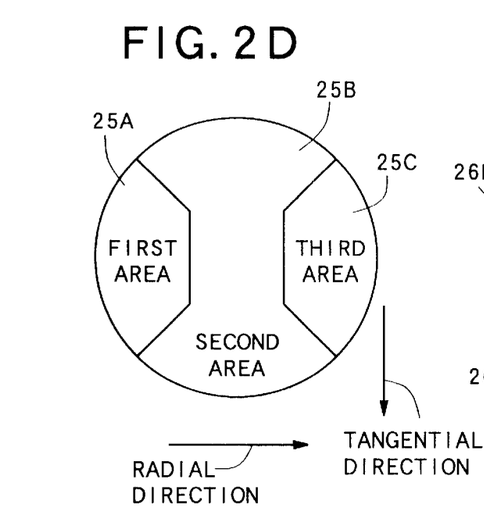
FIGS. 2D and 2E show divided-area structures of the liquid crystal panel.

FIG. 2D exemplifies a plan view of the liquid crystal panel 2A that is responsible for correcting aberration in the radial direction. As shown therein, in the radial direction of the disk, each of the transparent substrate 22A and 22B of the panel 2A is divided into three areas; that is, a first area 25A locating at a radially inner side, a second area 25B in the middle of the region along the radial direction, and a third area 25C at a radially outer side. Variably controlling these three divided area with individual drive voltages, area by area, permits differences in the phase of light passing through each divided area to be altered independently from each other. It is therefore possible that coma aberration and others caused due to tilt in the radial direction is corrected. Normally, a tilt-correction amount against a tilt angle caused in the radial direction (hereinafter, referred to as "radial tilt angle"), which is required for the tilt correction, is symmetric about the second area 25B. Thus, the characteristics of phase differences set to both the first and third areas 25A and 25C are opposite to each other. For more accurate tilt correction in the radial direction, the number of radially divided areas in the liquid crystal panel can be increased.

Figure 2E:
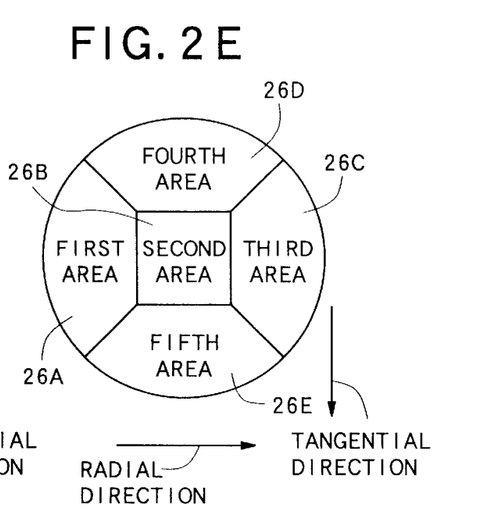

In addition to the correction in the radial direction, for correcting tilt errors caused in the tangential direction (which is the tangent direction of the tracks), the panel 2A can be divided into five areas, as shown in FIG. 2E. In the case of FIG. 2E, a fourth and fifth areas 26D and 26E as divided areas in the tangential direction are added to the first to third areas 26A to 26C divided in the radial direction. Thus, the correction of tilt error can also be performed in the tangential direction. The characteristics of the correction amounts of the fourth and fifth areas 26D and 26E may be set to symmetric with respect to the tilt angle in the tangential direction. Also, for this tangential direction, it is possible to increase the number of divided areas.

Figure 3:
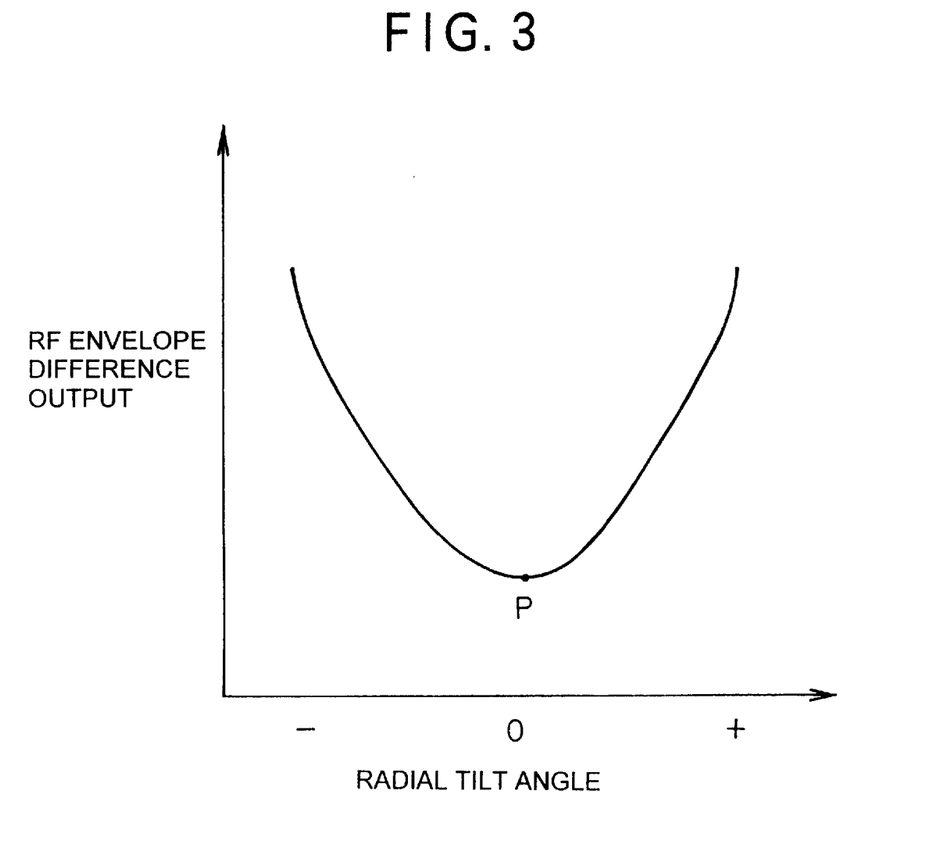
FIG. 3 exemplifies the relationship between a radial tilt angle and an RF envelope difference output.

Next, the principle of the tilt correction in this embodiment will be described. FIG. 3 shows one example of the relationship between the radial tilt angle and the RF envelope difference output. The RF envelope difference output is the difference between the maximum value and the minimum value of the RF envelope signal.

As shown in FIG. 3, when the radial tilt angle is zero, the RF envelope difference output becomes a minimum value. As the radial tilt angle becomes higher, the RF envelope difference output increases. In general, the vibration of the disk surface is caused synchronously with the rotation of the optical disk 1, and is superposed on the tilt of the beam, thereby providing the RF envelope signal with cyclic changes. When the tilt correction is performed such that the radial tilt angle becomes zero, the cyclic changes of the RF envelope signal, which are caused on account of disk surface vibrations, are suppressed, thereby reducing the RF envelope difference output to its minimum value. In this embodiment, such characteristic of the optical disk 1 is utilized to perform the tilt correction. It is noted that the characteristic shown in FIG. 3 was proved to be correct by an experiment.

As the above, the relationship between the radial tilt angle and the RF envelope difference output changes as shown in FIG. 3 and is defined by a quadratic curve. Hence, minimizing the RF envelope difference output (i.e., the output is directed to the bottom point P in the curve) allows the radial tilt angle to be zero or approximate zero, thereby realizing the tilt correction. In this embodiment, by adjusting drive voltages to the liquid crystal panel 2A in order to give phase differences to light, the tilt correction is performed. Specifically, to realize the tilt correction without a tilt sensor, control is performed in a manner that disturbances are given to drive voltages to the liquid crystal panel 2A so that the RF envelope difference output becomes smaller. This correction will be detailed later.

Figure 4:
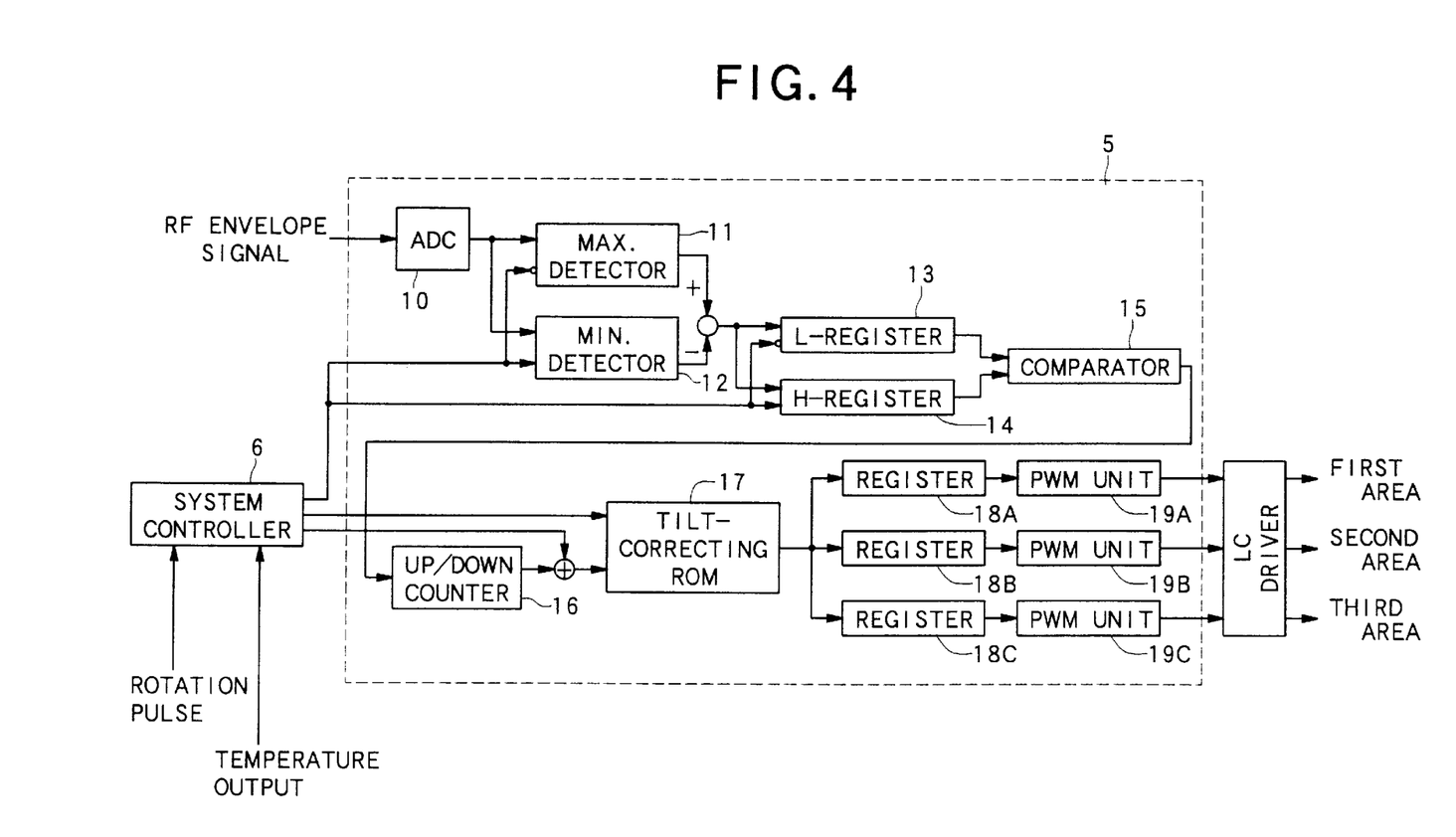
FIG. 4 is a block diagram showing a tilt-correction controller.

The tilt-correction controller 5 is configured in a block form, as shown in FIG. 4.

The tilt-correction controller 5 shown in FIG. 4 serves as a unit to control a correction amount of the tilt error. The controller 5 includes an A/D converter 10, a maximum detector 11, a minimum detector 12, an L-register 13, a H-register 14, a comparator 15, an up/down counter 16, a tilt-correction ROM 17, registers 18A to 18C, and PWM units 19A to 19C.

To this controller 5, the RF envelope signal supplied by the RF envelope detector 4 is inputted. This input signal enters the A/D converter 10, where it is converted into a digital-form data consisting of a predetermined number of bits and having a predetermined sampling frequency. This signal processing is required because the tilt-correction control is performed on a digital data basis, as described later.

The maximum detector 11 detects, under control of the system controller 6, a maximum value of the digital RF envelope signal within one rotation period of the optical disk 1 specified by the rotation pulse. Likewise, the minimum detector 12 detects a minimum value of the digital RF envelope signal within one rotation period of the optical disk 1.

The maximum value and minimum value thus-detected are then subjected to subtraction to provide a difference amount. Under control of the system controller 6, the difference amount is stored in either the L-register 13 or the H-register 14 according to later described control. The system controller 6 conducts control so that the peak P shown in FIG. 3 is followed on the basis of the difference value.

The comparator 15 compares the values read from the L- and H-registers 13 and 14. Stored in the L- and H-registers 13 and 14 are difference values corresponding to two types of disturbances, so that it is possible to determine a direction in which the disturbances change. More detailed processing will be given later.

The up/down counter 16 counts up or down in response to reception of the compared result by the comparator 15, and figures out an address necessary for the tilt-correction ROM 17. The count value is added to a reference address given by the system controller 6, thereby obtaining the address for the tilt-correction ROM 17.

The tilt-correction ROM 17 stores data corresponding to corrected phases assigned to the individual divided areas of the liquid crystal panel 2A. These data are obtained through an experiment conducted to optimize a phase-correcting amount against the radial tilt angle. Mapping of these data is such that the phase-correcting amounts of the tilt angle increase and decrease as the address advances. Hence, by reading out data from the tilt-correction ROM 17 with the increasing or decreasing address, the phase-correcting amounts for the liquid crystal panel 2A can be varied correspondingly.

The phase-correcting data read from the ROM 17 are sent to the liquid crystal driver 7 that drives the individual divided areas, via the register 18A and the PWM unit 19A for the first area 25A, the register 18B and the PWM unit 19B for the second area 25B, and the register 18C and the PWM unit 19C for the third area 25C, respectively. Thus, each divided area is driven to correct a phase-correcting amount thereof.

In the data table owned by the tilt-correction ROM 17, the values of the radial tilt angles correspond to the addresses, respectively. On account of the fact that the tilt errors caused in association with the radial tilt angles have a symmetry about the three divided areas of the liquid crystal panel 2A, the phase-correcting amounts are set such that the amount for the second area 25B is centered, the amount for the first area 25A increases in one direction with the increasing addresses, and the amount for the third area 25C increases in the opposite direction with increasing addresses.

The stored data in the tilt-correction ROM 17, which are obtained through an experiment conducted in advance, are used for providing a phase difference to each divided area of the liquid crystal panel 2A. The data are set so that the jitters are less and become the most favorable state for every predetermined radial tilt angles. By setting the steps of the radial tilt angles more precisely to increases an entire amount of stored data, it is possible to perform the tilt correction in a higher resolution. Although hardware units can construct the tilt-correction controller 5, most of the processing done therein may be achieved by software procedures.

Figure 5:
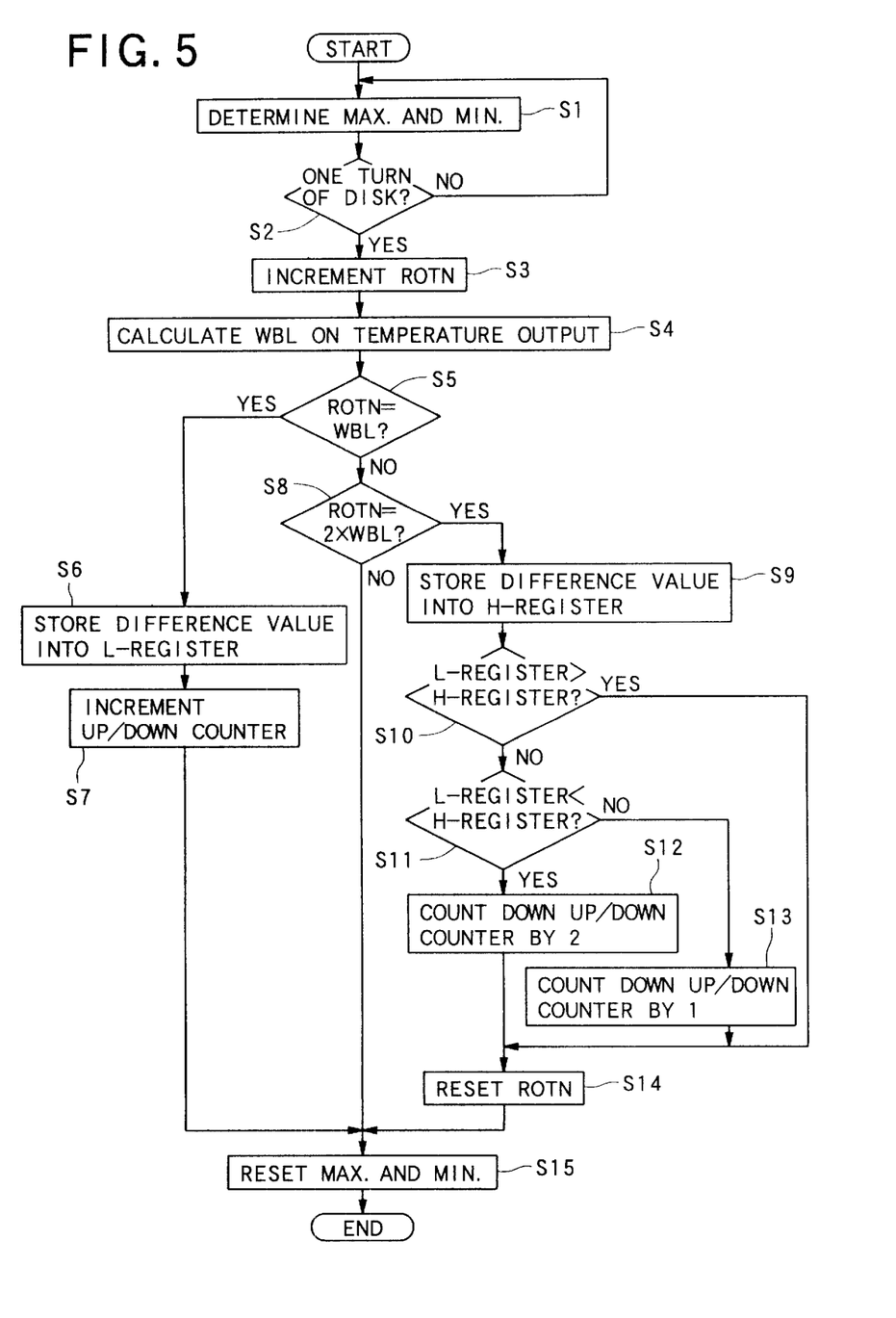
FIG. 5 is a flowchart representing processing of the tilt-correction control.

Next, referring to a flowchart shown in FIG. 5, processing for the tilt-correction control will be detailed. The processing exemplified herein is executed, for example, during the recording information on the optical disk 1 or the reproduction thereof, by the system controller 6 that operates on an interruption basis at a predetermined interval.

When the tilt-correction control processing is activated, first, at step S1, a maximum value and a minimum value of the RF envelope signal are detected as described above. The RF envelope signal that changes from time to time is read, and compared with the maximum value and the minimum value which have already been stored, respectively. If the update is required, a new value for the maximum value and/or minimum value is written over the previous one.

At step S2, it is determined whether or not the optical disk 1 has completed its one turn. The tilt correction is controlled in synchronism with the rotation periods of the optical disk 1. Thus, both the maximum value and the minimum value are obtained within a period for one rotation of the optical disk 1. The determination is performed by monitoring the rotation pulse from the spindle motor 3 supplied to the system controller 6.

When the completion of one turn of the optical disk 1 is found at step S2 (YES at step S2), the processing is passed to step S3. At this time, the maximum value and the minimum value of the RF envelope signal is fixed. In contrast, if the optical disk 1 has not completed its one turn (NO at step S2), the processing is returned to step S1, then repeating the processes at steps S1 and S2 until the optical disk 1 completes its one turn.

At step S3, a variable ROTN, employed as a counter for the number of rotations of the optical disk 1, is incremented. The variable ROTN is a counter used to allow the rotation of the optical disc 1 to be synchronized with cycles of variation of disturbance applied during the tilt correction.

At step S4, the value of a variable WBL is calculated on the basis of a temperature output supplied to the system controller 6 from the temperature sensor 8. The variable WBL is used for associating the rotation speed of the optical disk 1 with the variation periods of disturbances applied to the tilt correction, and specifies the number of rotation of the optical disk 1 for half the variation periods of disturbances. In this embodiment, to avoid or suppress influence on the tilt correction due to the temperature characteristic of the liquid crystal panel 2A, the set value to the variable WBL is altered correspondingly to the temperature output from the temperature sensor 8. The detailed explanation for the temperature characteristic of the liquid crystal panel 2 and setting the variable WBL will be given later.

At step S5, it is determined if the variables ROTN and the WBL are equal to each other. When being ROTN=WBL at step S5 (YES at step S5), the processing proceeds to step S6. This corresponds to a situation where the time reached half the variation periods of disturbances. On one hand, when the ROTN and WBL are not equal to each other (NO at step S5), the processing goes onto step S8.

At step S6, a difference value is obtained by calculating subtraction between the maximum value and the minimum value which have already been detected within a period for one turn of the optical disk 1. The obtained difference value is stored into the L-register 13.

At step S7, the up/down counter 16 is incremented to advance a reading address by one in the tilt-correction ROM 17. By this, the disturbances are applied to the tilt correction. Then, the processing goes to step S15.

On one hand, at step S8, it is determined whether or not the value of the ROTN has reached two times that of the WBL. The determination that the ROTN is not equal to "2×WBL" recognized at step S8 (NO at step S8) makes the processing proceed to step S15. On the contrary, the determination that "ROTN=2×WBL" is recognized at step S8 (YES at step S8) makes the processing proceed to step S9.

At step S9, the foregoing difference value is obtained by performing subtraction between the maximum value and the minimum value which have already been obtained within a period for one turn of the optical disk 1. The obtained difference value is then stored in the H-register 14. Thus, the difference values are stored in both the L-and H-registers alternately (that is, steps S6 and S9).

At step S10, if the difference value stored in the H-register is smaller than that in the L-register or not is determined. When such condition is attained (YES at step S10), the up/down counter 16 is left without count, and the processing goes to step S14.

However, if the determination at step S10 is NO, the processing goes to step S11, where it is determined whether or not the difference value stored in the L-register is smaller than that in the H-register. As a result, in the case that the value in the L-register is less than that in the H-register (YES at step S11), the up/down counter 16 counts down by 2 at step S12 to return the reading address for the tilt-correction ROM 17 by 2.

In the case of "NO" at step S11, the difference values stored in both the L- and H-registers are equal to each other. Thus, the up/down counter counts down by 1, reducing the reading address for the tilt-correction ROM 17 by one.

The above steps S10 to S13 provide the next reading address for the tilt-correction ROM 17, which is used for reading in the next rotation of the optical disk 1. Precisely, the next reading address is given as any one of different values −1, 0, or +1, depending on the increments carried out by the up/down counter 16.

Finally, at step S15, the maximum value and the minimum value within a period for one turn of the optical disk 1 are reset. This is because a maximum value and a minimum value are reset to zero to prepare for the next one turn of the optical disk 1. Although the tilt-correction processing terminates after step S15, the processing of steps S1 to S15 are repeatedly executed during an operative period of the tilt servo control.

Figure 6:
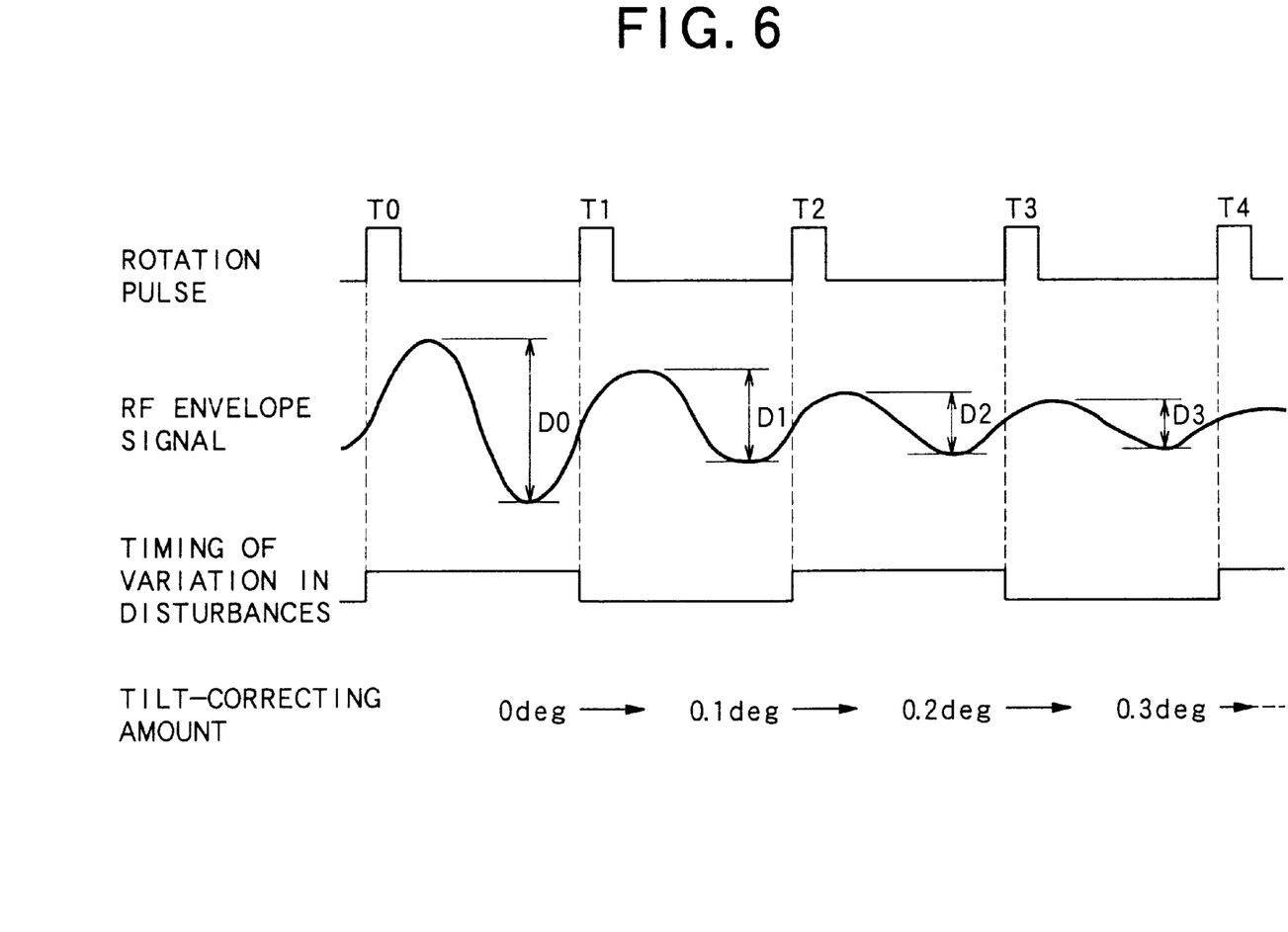
FIG. 6 exemplifies waveform patterns explaining operation of the tilt-correction control.

Referring to FIG. 6, a set of waveform patterns are exemplified, which represent the operation of each component of the tilt servo control apparatus of the present invention under tilt-correction control.

In FIG. 6, there are shown the rotation pulse signal produced by the spindle motor 3, the RF envelope signal outputted by the RF envelope detector 4, a waveform indicative of timing of variations of disturbances used for the tilt correction, the tilt-correction amounts, which changes as the time elapses, for the liquid crystal panel 2A based on the tilt-correction control. As to the rotation pulse signal, FIG. 6 shows an example in which only one rotation pulse is outputted per one rotation of the spindle motor 3.

As shown in FIG. 6, the rotation pulses are outputted from the spindle motor 3 over timing T0 to T4. So as to be synchronous with the rotation pulses, disturbances for the tilt correction are applied in the foregoing tilt-correction control. Explained hereinafter is a case in which the foregoing variable WBL is set to 1 (WBL=1).

In FIG. 6, for the first rotation of timing T0 to T1, the timing of variations of disturbances is in the former half of a period of one cycle thereof. It is assumed that the tilt-correction amount for the tilt-correction ROM 17 is zero degrees and the RF envelope signal oscillates with a difference D0.

When making transition to the second rotation between T1 and T2, the timing of variations of the disturbances is in the latter half of the period thereof. In response to this transition to the second rotation, the disturbances are varied such that the difference of the RF envelope signal becomes smaller, and the tilt-correction amount is 0.1 degrees. In addition, the RF envelope signal oscillates with the difference D1 smaller than the difference D0.

When making transition to the third rotation between T2 and T3, the timing of variations of the disturbances is in the former half of the period thereof again. In this period, the result of the tilt correction that responded to the previous variation period of the disturbances is reflected, and the control is performed such that the tilt-correction amount is increased from 0.1 to 0.2 degrees. The RF envelope signal begins to oscillate with a difference D2 smaller than the last difference D1.

When making transition to the fourth rotation between T3 and T4, the timing of variations of the disturbances is in the latter half of a period thereof again. In this period, the control is performed in a similar way to the second one. The tilt-correction amount is increased to 0.3 degrees, the RF envelope signal is changed to have a smaller difference D3.

In this way, altering the disturbances for the tilt correction in association with the rotation of the spindle motor 3 enables variations in the amplitude of the RF envelope signal to be gradually lowered. Finally, it reaches the stable peak point P shown in FIG. 3, providing an optimum tilt-correction amount.

Next, the tilt-correction control in consideration of a temperature characteristics of the liquid crystal panel 2 will be described.

Figure 7:
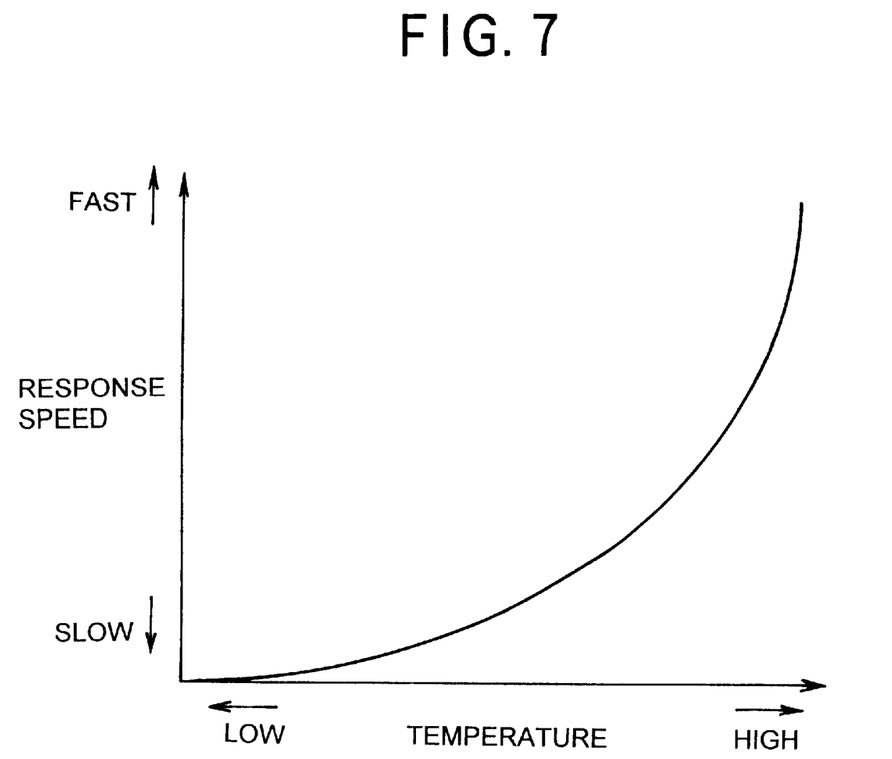
FIG. 7 exemplifies a graph showing a temperature characteristic of the response speed of liquid crystal.

FIG. 7 shows the relationship between a response speed of liquid crystal and the temperature. On the whole, the viscosity coefficient of liquid crystal increases as the ambient temperature decreases. Accordingly, the response speed of liquid crystal obtained when a drive voltage is applied can be represented as shown in FIG. 7, wherein the higher the temperature is, the faster the response speed gets. Therefore, in giving disturbances to the tilt-correction amount for the liquid crystal panel 2A in performing the foregoing tilt-correction control, by considering the effect due to a lowered response speed of liquid crystal whose temperature is lowered, a tilt servo control apparatus having favorable temperature characteristics can be achieved.

Figure 8A:
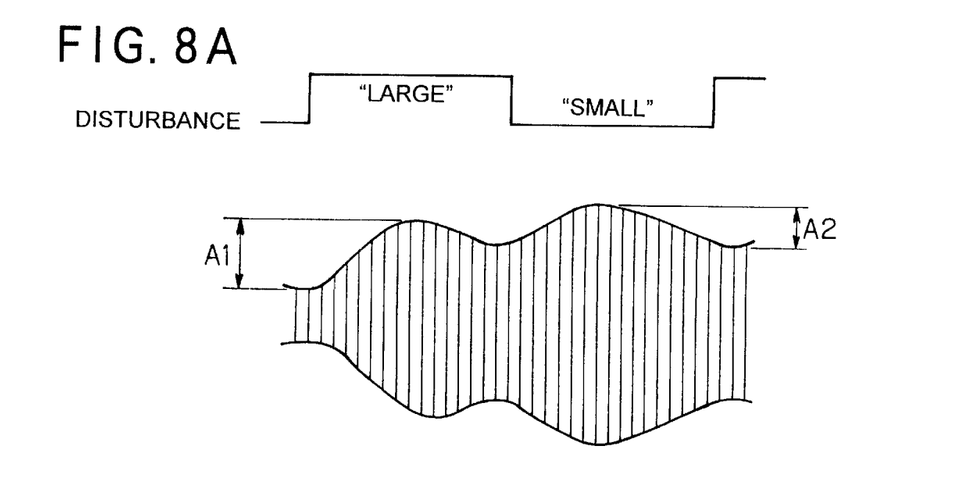
FIGS. 8A and 8B are diagrams explaining the relationship between the temperature of liquid crystal and variation in the characteristic of the tilt correction.
Figure 8B:
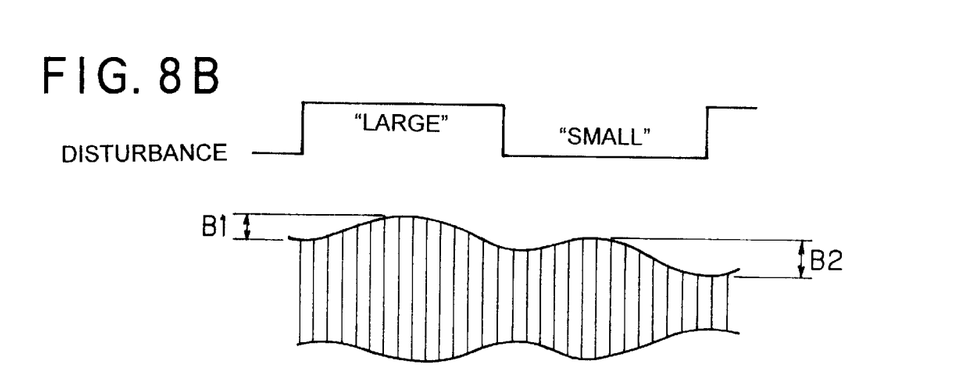

FIGS. 8A and 8B represent changes in tilt correction characteristics in a situation where the response speed of liquid crystal is affected by changes in temperature. In each of FIGS. 8A and 8B, it is supposed that the applied disturbances changes alternately between one level that increases the RF envelope difference output and another level that decreases it; the former is represented by "large" and the latter is represented by "small."

FIG. 8A is a view that shows changes in an RF signal in the room temperature. As shown therein, disturbances are applied in synchronism with the rotation pulse, in which the disturbance are set to "large" in the first rotation period, then to "small" in the next rotation period. For the "large" disturbance, variations in the amplitude of the RF signal correspond to a range shown by a reference A1, while, for the "small" disturbance, those correspond to another range shown by a reference A2. If a condition A1>A2 is established, it is understood that the tilt correction is correctly performed.

FIG. 8B is a view that shows changes in an RF signal in a low temperature. Like the condition in FIG. 8A, similar disturbances are applied in synchronism with the rotation pulse. For the "large" disturbance, changes in the amplitude of the RF signal correspond to a range shown by a reference B1, while, for the "small" disturbance, those correspond to another range shown by a reference B2, resulting in B1<B2. It is understood that the changes in the amplitude of the RF signal cannot follow up the changes in "large" and "small" of the applied disturbances, thus causing a phase shift of about 180 degrees. This phenomenon is resulted from the lowered response speed of the liquid crystal of the liquid crystal panel 2A whose operation temperature is decreased, wherein changes in the refraction index of the liquid crystal cannot satisfactorily follow up the cycles of the disturbances that changes between "large" and "small."

In addition, since one disturbance (for example, "small") is applied before the liquid crystal has finished following the other disturbance (for example, "large") completely, it is understood that an amount of changes in the amplitude of the RF signal decreases, as exemplified in B1 to B2 in FIG. 8B.

To avoid such influence of a temperature characteristic of the liquid crystal caused in a lower temperature environment, this embodiment employs such a technique that the periods of changes in the disturbances added to the tilt-correction amount are altered. A practical way is that a value is set while adjusting the foregoing variable WBL correspondingly to temperature outputs of the temperature sensor 8. This processing is carried out at step S4 in the flowchart shown in FIG. 5.

For example, for temperatures of more than 20 degrees, the variable WBL may be set to 1; for temperatures of over zero to 20 degrees, the variable WBL may be set to 2; and for temperatures of −20 to zero degrees, the variable WBL may be set to 3. Thus, the rotation number of the optical disk 1 detected for one period of changes in the disturbances is increased in the lower temperatures. As the temperature decreases, the disturbances vary at slower speeds. Therefore, even when the response of the liquid crystal becomes slower, the disturbances that can be sufficiently followed by the liquid crystal is applied. This overcomes the foregoing drawback.

In the embodiment, there is provided a construction in which a temperature sensor 8 is arranged for eliminating or relieving the influence of changes in the temperature characteristic of liquid crystal. However, the temperature sensor 8 can be omitted if the temperature characteristic of a tilt servo control apparatus is not so severely required. In this case, the temperature characteristic can be improved by processing without the temperature sensor 8. Although an available temperature range of the tilt servo control apparatus is narrowed to some extent, the construction and processing are simplified instead.

Moreover, in this embodiment, though two types of correction amounts are adopted as the disturbance, three or more types of correction amounts, which have values falling in a predetermined range, can be added as the disturbances for selecting any correction amount that is able to minimize changes in the amplitude of the RF signal.

In this embodiment, the tilt correction control is performed in a manner that the control signal is varied and variations in the amplitude of the detected signal are minimized. Accordingly, tilt servo control can be done without a tilt sensor, and can provide a high quality reproduction of information, and the construction of the apparatus can be simplified and compact. In addition, the tilt correction control is directed to a minimum point of variations in the amplitude of the detected signal. Thus this also provides the identical advantages to the above.

Furthermore, the tilt correction is performed by controlling the drive signals applied to the liquid crystal panel placed in the optical beam axis. This eliminates the necessity of using a mechanism controlling the inclination of the optical pickup. Additionally, this construction is effective in making the apparatus compact. A higher reliability is also obtained. And a high quality of reproduction of information can be carried out.

Furthermore, the liquid crystal panel is divided into three areas in the radial direction and each drive signal to the divided areas is controlled. This construction can provide the similar advantages to the above.

Still further, the rates of variations in the control signal are varied on a temperature detection result. Therefore, this makes it possible to avoid deterioration of characteristics of tilt correction resulting from a fact that the response speed of liquid crystal depends on changes in temperature. And this can provide tilt servo control whose temperature characteristic is superior.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.10-072888 filed on Mar. 20, 1998 including the specification, claims, drawings and summary is incorporated herein by reference in its entirety.

What is claimed is:

1. A tilt servo control apparatus comprising:
   an optical pickup for irradiating an optical beam onto an optical disk and detecting a reflected light from the optical disk;
   a tilt-correction unit for correcting, using a correction amount, a tilt error due to aberration caused by a tilt angle formed between an optical axis of the optical beam and a normal line of the optical beam at an irradiated position on the optical disk;
   an amplitude detecting unit for detecting a maximum amplitude and a minimum amplitude of a detected signal by the optical pickup within a period of one rotation of the optical disk; and
   a tilt-correction controlling unit for providing a control signal to control the correction amount used in the tilt-correction unit, the tilt-correction controlling unit comprising unit for applying variations to the control signal and adjusting the control signal so that a difference between the maximum amplitude and the minimum amplitude is minimized responsively to the variations.

2. The apparatus of claim 1, wherein the tilt-correction unit comprises a liquid crystal panel for correcting the aberration arranged within the optical axis of the optical beam, wherein the control signal used in the tilt-correction controlling unit is a drive signal applied to the liquid crystal panel.

3. The apparatus of claim 1, wherein the tilt-correction controlling unit comprises a unit for producing disturbances to be supplied to the control signal, a unit for comparing differences between the maximum amplitude and the minimum amplitude each corresponding to the disturbance, and a unit for varying the control signal by a given amount such that the differences are reduced.

4. The apparatus of claim 3, wherein the tilt-correction unit comprises a liquid crystal panel for correcting the aberration arranged in the optical axis of the optical beam, wherein the control signal used in the tilt-correction controlling unit is a drive signal applied to the liquid crystal panel.

5. The apparatus of claim 4, wherein the liquid crystal panel is divided into three areas consisting of an inner-track-side area, a middle area, and an outer-track-side area in a radial direction of the optical disk, wherein the divided areas are driven by the drive signal independently of each other.

6. The apparatus of claim 1, further comprising a temperature detecting unit for detecting a temperature relating to operation of the liquid crystal panel, wherein the tilt-correction unit comprises a unit for variably controlling a speed of the variations provided to the control signal on the basis of a result detected by the temperature detecting unit.

7. A tilt servo control system for use with an optical disk reading apparatus, the optical disk reading apparatus having an optical pickup for applying an optical beam onto an optical disk and for detecting light reflected from the optical disk, the tit servo control system comprising:
   a tilt-correction unit for correcting tilt errors of the optical pickup due to aberrations in the optical disk reading apparatus, the tilt correction unit being responsive to a control signal;
   an amplitude detection unit, responsive to the detected light from the optical pickup, for determining a maximum amplitude and a minimum amplitude of a detected signal within a predetermined period of time; and
   a control unit for generating the control signal, the control unit being responsive to the amplitude detection unit, for varying the control signal in order to minimize a difference between the maximum amplitude and the minimum amplitude of the detected signal.

8. The tilt servo control system of claim 7, wherein the predetermined period of time is equal to a period equal to one rotation of the optical disk.

9. The tilt servo control system of claim 7, wherein the tilt-correction unit comprises a liquid crystal panel for correcting the aberration in the optical disk reading apparatus, wherein the control signal used in the tilt-correction controlling unit is a drive signal applied to the liquid crystal panel.

10. The tilt servo control system of claim 7, wherein the tilt-correction unit comprises a unit for producing disturbances to be supplied to the control signal, a unit for comparing differences between the maximum amplitude and the minimum amplitude each corresponding to the disturbance, and a unit for varying the control signal by a given amount such that the differences are reduced.

11. The tilt servo control system of claim 10, wherein the tilt-correction unit comprises a liquid crystal panel for correcting the aberration in the optical disk reading apparatus, wherein the control signal used in the tilt-correction controlling unit is a drive signal applied to the liquid crystal panel.

12. The tilt servo control system of claim 11, wherein the liquid crystal panel is divided into three areas consisting of an inner-track-side area, a middle area, and an outer-track-side area in a radial direction of the optical disk, wherein the divided areas are driven by the drive signal independently of each other.

13. The tilt servo control system of claim 7, further comprising a temperature detecting unit for detecting a temperature relating to operation of the liquid crystal panel, wherein the tilt-correction unit comprises a unit for variably controlling a speed of the variations provided to the control signal on the basis of a result detected by the temperature detecting unit.

14. A method for correcting tilt errors of an optical disk reading apparatus comprising the steps of:

emitting an optical beam onto an optical disk;

detecting reflected light from the optical disk;

detecting a maximum amplitude and a minimum amplitude of the reflected light within a period of time;

generating a correction signal responsive to the detected maximum amplitude and minimum amplitude of the reflected light; and varying the correction signal to minimize a difference between the maximum amplitude and minimum amplitude.

15. The method of claim 14, wherein the predetermined period of time is equal to a period of time equal to one rotation of the optical disk.

* * * * *